United States Patent [19]
Berger, deceased et al.

[11] 3,894,968

[45] July 15, 1975

[54] METHOD OF MAKING AN ANTIPOLLUTION CATALYST AND PRODUCT OF THE METHOD

[76] Inventors: Heinz Berger, deceased, late of Hoxter, Weser, Germany; Heinz-Werner Berger, sole heir, Drenker Str. 26b, 3470 Amelunxen u. Hoxter, Germany

[22] Filed: May 15, 1972

[21] Appl. No.: 253,565

[52] U.S. Cl............. 252/455 R; 252/454; 252/457; 252/460; 252/477 R
[51] Int. Cl. ........................ B01j 11/40; B01j 11/32
[58] Field of Search.... 252/455 R, 448, 446, 477 R, 252/457

[56] References Cited
UNITED STATES PATENTS

| | | | |
|---|---|---|---|
| 2,816,081 | 12/1957 | Heath et al. | 252/448 X |
| 3,533,753 | 10/1970 | Berger | 252/477 R |

FOREIGN PATENTS OR APPLICATIONS

| | | | |
|---|---|---|---|
| 593,849 | 10/1947 | United Kingdom | 252/477 R |
| 800,338 | 8/1958 | United Kingdom | 252/477 R |

Primary Examiner—C. Dees
Attorney, Agent, or Firm—Karl F. Ross; Herbert Dubno

[57] ABSTRACT

A catalyst for the decontamination of the exhaust fumes of an internal-combustion engine is made by reducing a mineral mass to a submillimeter particle size and then combining it with an active-metal component. The mixture is further communited in a colloid mill and combined with an aqueous solution of a noblemetal salt to form a paste. The paste is shaped and fired at 800°C to 1050°C to form a catalyst body.

4 Claims, No Drawings

METHOD OF MAKING AN ANTIPOLLUTION CATALYST AND PRODUCT OF THE METHOD

CROSS REFERENCE TO RELATED APPLICATION

This application is related to our copending application Ser. No. 181,692 filed 20 Sept. 1971, now Pat. No. 3,775,064 and entitled "Apparatus for Detoxifying Exhaust Emissions of an Internal-Combustion Engine."

FIELD OF THE INVENTION

Our present invention relates to a method of making a catalyst body of high effectiveness in detoxifying or decontaminating the exhaust gases of internal-combustion engines and providing improved nitrogen-oxide removal. The invention also relates to the catalyst body made by this process.

BACKGROUND OF THE INVENTION

Considerable effort has been made, in recent years, to design catalyst systems for the catalytic reformation, afterburning or modification of the exhaust gases of internal-combustion engines for vehicles and other purposes, in order to reduce the toxic emissions therefrom. Such toxic emissions generally include carbon monoxide and hydrocarbons, in addition to nitrogen oxide, which are substantially incombustible and cannot be satisfactorily removed by conventional catalyst systems. In the aforementioned copending application and in the catalyst and afterburner literature generally, it has been pointed out that certain catalyst systems, generally comprising a support body of a refractory material, one or more active metals and one or more noble metals of the platinum group e.g. platinum, palladium, rhodium and iridium may be used effectively to reduce toxic emissions.

However, the conventional systems have not been able to sufficiently reduce the nitrogen oxide content of the emitted gas and have been found to lose their effectiveness relatively rapidly. For practical purposes and because of the economics of such catalyst systems, it is essential that the catalyst body retain at least 80 to 90 percent of its effectiveness over a useful life of 60,000 to 80,000 kilometers. Prior-art systems have been found within 25,000 to 30,000 kilometers to have an effectiveness reduced by 50 percent or more.

It should also be noted that California and several European countries have established standards of internal-combustion engine emission control which require rapid starting (low-temperature) oxidation of the exhaust fumes. The catalyst must also be resistant to heat and poisoning by lead and other contaminants of gasoline, and should be mechanically stable.

OBJECTS OF THE INVENTION

It is thus an object of the invention to provide an improved catalyst system which avoids the aforementioned disadvantages, is of relatively low cost and is longlasting.

Another object of the invention is to provide a method of making a catalyst body, especially for the detoxification of the exhaust gas of an internal-combustion engine whereby a useful life of up to 80,000 kilometers with retention of emission detoxification of about, say, 80 percent is obtained and the catalyst is highly effective for rapid starting of oxidation and elimination of nitrogen oxides in the discharged gases.

Yet another object of the invention is to provide a method of making a catalyst having high-heat resistance, low sensitivity to catalyst poisons, hgh mechanical disability, long life and efficient elimination of nitrogen oxide from the exhaust gas of an internal combustion engine.

SUMMARY OF THE INVENTION

These objects and others which will become apparent hereinafter are attained, in accordance with the present invention, which comprises a method of making an improved catalyst whereby the support for the active material is subdivided in the micronic or submillimetric range defined for the purposes of the present invention as a particle size of the order of microns to tens of microns, (e.g. 0.5 to 100 microns), whereupon an active-metal component is combined with the submillimetric particles and the mixture is homogenized and further ground. The resulting mixture is formed into a paste with an aqueous solution of a noble metal or platinum-group metal compound, the paste being shaped and fired at a temperature between 800° and 1050°C.

More particularly, the disadvantages of the prior systems described above are obviated by subdividing the carrier material into the smallest particles obtainable by mechanical disintegration and homogenizing the material so that when the carrier consists of several components, these components are homogeneously mixed. The active-metal compound, preferably in suspended form, is then added to the finely subdivided carrier or support material and homogeneously blended therewith, the resulting mixture being further comminuted by ultrasonic disintegration, colloid milling or like micronization prior to mixing the system with the noble metal solution and, if desired, the distilled water to form a plastic homogenously mixed mass. Prior to firing at a temperature between 800° and 1050°C, the mass is dried and shaped.

The resulting body has a surprisingly rapid (low-temperature) starting oxidation, high hardness, relatively large effective internal and external surface arrangements and activity, high mechanical strength and resistance to abrasion and high-heat resistance. It is capable of operating even with sudden increases in gas flow, brief temperature excesses and is resistant to poisoning by lead and sulphur compounds or disk elements. The catalyst is also unaffected by silica and aluminum reactions which affect earler catalyst systems. The catalyst can be subjected to tumbling or other mechanical treatment to eliminate any deactivating glaze which may form upon the surface of the body during the firing step, thereby completely exposing the active surface.

According to an important feature of the present invention, the support-material mixture is subjected to comminution in a colloid mill or in ultrasonic disintegrator to a particle size within the range of about .0005 − .02 mm. When a colloid mill is used the particle size is approximately 0.015 mm while the use of an ultrasonic disintegrator gives particles of a diameter of about 0.001 mm. The metal component likewise may be mixed and comminuted with the support-material component in a colloid mill or by the ultrasonic disintegrator in which case similar particle sizes are found in the mixed product. Best results, are, however, obtained when the support material is comminuted in the colloid mill, the metal component is added to the colloid mill and the resulting mixture is then subjected to ultrasonic disintegration. A two-stage comminution thus results.

According to another feature of the invention, the support material comprises 25 – 35 percent by weight magnesium silicate, 25 – 35 percent by weight aluminum silicate and 5 – 15 percent by weight combustible organic substances such as powdered coal, powdered wood charcoal, lignite or the like.

The inorganic or organic components of the support substance may be composed in whole or in part from naturally occurring materials such as clay or kaolin alone or together with hard or soft coal or wood charcoal.

The active metal compounds which are micronized with the support material are preferably 8 – 20 percent by weight cobalt oxide, 6 – 10 percent by weight manganese oxide and 2 – 10 percent by weight copper oxide. The aqueous noble-metal salt solution, preferably palladium chloride or platinum chloride solution, is used in an amount of 0.01 to 5 percent by weight. The above proportions are given in terms of the plastic mass before firing, the active-metal solution being given in terms of the metal compound proportion. Any concentration of the solution which provides an equivalent metal proportion in the plastic body and moisture in an amount which will allow the mass to be shaped by molding is satisfactory.

SPECIFIC EXAMPLES

Example I

A mixture of 35 percent by weight magnesium silicate, 35 percent by weight aluminum silicate and 2.7 percent by weight wood charcoal powder is subdivided and mixed in a colloid mill to a particle size of about 0.015 mm. The mass is substantially homogeneous. To this material, 15 percent by weight cobalt oxide, 8 percent by weight manganese oxide and 4 percent by weight copper oxide are added in powder form and milling is continued until the entire mass is homogeneously blended into the indicated particle size. 0.3 percent by weight of palladium (II) chloride solution and distilled water is then added in the colloid mill operated for blending purposes. The homogeneously mixed plastic mass is dried, shaped into pieces in a vacuum press and fired at 975°C. The pieces are tumbled to remove any glaze. The catalyst may be used in an apparatus of the type described in the aforementioned copending application.

Example II

Using the proportions and materials of Example I, a catalyst mass is made as described in the colloid mill except that the palladium solution is replaced by an equivalent quantity of platinum chloride solution and no distilled water is added. The plastic mass is dried, shaped and fired as described. In Examples I and II, the product is found to be especially effective in reducing nitrogen oxide concentrations in the exhaust gas of an internal combustion engine.

Example III

The method and proportions of Example I are followed except that the mass is subdivided into a particle size of about 0.001 mm with ultrasonic disintegrator. Again the mass is shaped, dried and fired as set forth in Example I.

Example IV

The method of Example II is followed except that an ultrasonic disintegrator is employed as in Example III.

Example V

The method of Example I is followed except that, following grinding in the colloid mill, prior to addition of the solution, the mass is subjected to ultrasonic disintegration as in Example III.

Example VI

The method of Example II is followed with subsequent ultrasonic disintegration as in Example V.

The catalysts made by the aforementioned processes were subjected to the standard California and European tests. The product of Examples I and II demonstrated a starting oxidation temperature of 150° to 200°C and were fully effective over 80,000 kilometers. The product of Example III through VI had a starting oxidation temperature of 75° – 100°C and gave a useful life of at least 80,000 kilometers without significant loss of efficiency.

In all cases the product was found to be effective with a tubular configuration, the tubes having a length of 3.5 – 4 mm, an inner diameter of 1 mm and an outer diameter of 3 mm. With solid rods of the same external dimension, effective catalyst activity was observed although the tubules provided 25 percent greater effective surface arrangement. The catalyst was also put up in the form of perforated disks and has an extruded rod. All were effective as used in the system described in the aforementioned application.

We claim:
1. A method of making a catalyst for decontaminating exhaust emissions of an internal-combustion engine comprising the steps of:
   a. comminuting to a submillimetric particle size of about 0.015 mm to about 0.001 mm and intimately mixing a catalyst-support substance consisting essentially of 25 to 35 percent by weight magnesium silicate, 25 to 35 percent by weight aluminum silicate and 5 to 15 percent by weight of coal, charcoal or lignite to form a mass thereof;
   b. mixing with the comminuted mass of step (a) a catalytically active metal component consisting of at least one compound from the group which consists of manganese oxide, copper oxide and cobalt oxide and further comminuting the resulting mixture;
   c. blending the mixture of step (b) with an aqueous solution of a palladium chloride or platinum chloride salt to for a plastically shapeable paste;
   d. shaping said paste;
   e. firing the shaped paste of step (d) at a temperature of 800° to 1050° to produce a catalyst body; and
   f. mechanically treating said body to remove an activity-limiting film formed thereon during firing, comminution being carried out in step (b) in a colloid mill to a particle size of about 0.015 mm, said catalytically active metal component consisting of substantially 8 to 20 percent by weight cobalt oxide, 6 to 20 percent by weight manganese oxide and 2 to 10 percent by weight copper oxide, said noble metal solution being employed in the form of a platinum chrloride or palladium chloride solution with the platinum or palladium chloride present in an amount of 0.01 to 5 percent by weight, the paste being dried and shaped into tubes having an inner diameter of substantially 1 mm, an outer diameter of substantially 3 mm and a length of substantially 3.5 to 4 mm.

2. The method defined in claim 1 wherein said solution is blended with the mixture in step (c) in said colloid mill.

3. The method defined in claim 1 wherein the mixture is comminuted at least partly in step (b) by ultrasonic disintegration to a particle size of about 0.001 mm.

4. The method defined in claim 1, further comprising the step of mixing distilled water with the mass in step (c).

* * * * *